United States Patent [19]
Van Aken

[11] 3,784,912
[45] Jan. 8, 1974

[54] AUTOMATIC ZERO DEVICE

[75] Inventor: Harold R. Van Aken, Livingston Manor, N.Y.

[73] Assignee: Kollmorgen Corporation, Hartford, Conn.

[22] Filed: Aug. 11, 1972

[21] Appl. No.: 279,960

[52] U.S. Cl............................... 324/130, 324/99 D
[51] Int. Cl.......................... G01r 1/02, G01r 17/06
[58] Field of Search............... 324/130, 99 D, 99 R; 330/9

[56] References Cited
UNITED STATES PATENTS
3,509,460   4/1970   Mizrahi.............................. 324/130
3,159,787   12/1964   Sexton et al...................... 324/99 D

*Primary Examiner*—Gerard R. Strecker
*Assistant Examiner*—Ernest F. Karlsen
*Attorney*—Frederick E. Bartholy

[57] ABSTRACT

An automatic zeroing device for use with a measuring instrument is described. The device automatically causes the instrument to read a predetermined value, termed the zero value, in response to an input signal, regardless of the value of the input signal. The device is based on a modification of a digital to analog converter in a feedback loop which also includes a summing amplifier, receiving the input signal and a zeroing signal, and a comparator. The digital to analog converter produces the zeroing signal in response to the comparator output.

2 Claims, 2 Drawing Figures

AUTOMATIC ZERO DEVICE

BACKGROUND OF THE INVENTION

When using electronic measuring instruments it is often necessary or desirable to adjust the output reading to a specific value irrespective of the value of the input signal. For example, when using a null comparison technique, an applied reference signal is initially zeroed on the meter. The reference signal is then removed and a comparison signal applied thereto. The meter reading is then the difference between the reference and comparison signals. Further, in the field of photometry and densitometry, an instrument such as a densitometer, which is a voltmeter calibrated in density units, must be carefully set to zero or calibrated against a known parameter many times while making measurements.

Zeroing has in the past been accomplished using manual controls. However, manual controls are slow and an error can be introduced by the operator. It is preferable to control zeroing using automatic control circuitry, which upon operator command, automatically sets the instrument reading at a predetermined value regardless of the value of the input signal.

SUMMARY OF THE INVENTION

The invention provides for the automatic zeroing of a measuring instrument, regardless of the value of the input signal, upon the closing of an operator controlled zeroing switch. Although the disclosure makes reference to the zeroing of an instrument it is to be understood that the term zeroing is to read to mean setting the instrument to some predetermined value which may or may not correspond to the actual zero reading of the measuring instrument.

The inventive device can be used with conventional analog or digital measuring instruments including voltmeters and finds particular application with densitometers which must be carefully set to zero or calibrated against a known parameter many times during a measuring sequence.

To provide the automatic zeroing function, the device includes a version of a digital to analog (D/A) converter in a feedback loop, which also includes a summing amplifier and a comparator. The output of the D/A converter in the form of an incrementally varying signal is supplied to the summing amplifier simultaneously with the input signal to be zeroed. The output of the summing amplifier forms the input to the measuring instrument, which for the purposes of illustration only will be described herein as a voltmeter. The D/A converter output acts as a zeroing signal to cause the summing amplifier output to assume the predetermined or zero value.

The summing amplifier output is also supplied as one input to a comparator. A second input thereto is a reference potential corresponding to the predetermined value. When the two input signals to the comparator are equal, the comparator blocks the D/A converter from further incrementing its output. However, the output present when the converter is blocked remains until it is reset. If another input signal is applied to the summing amplifier its output assumes a value which is the difference between the predetermined, that is zero value, and the value of the new input signal.

DETAILED DESCRIPTION OF THE PREFERRED EMBODIMENT

Figure 1:
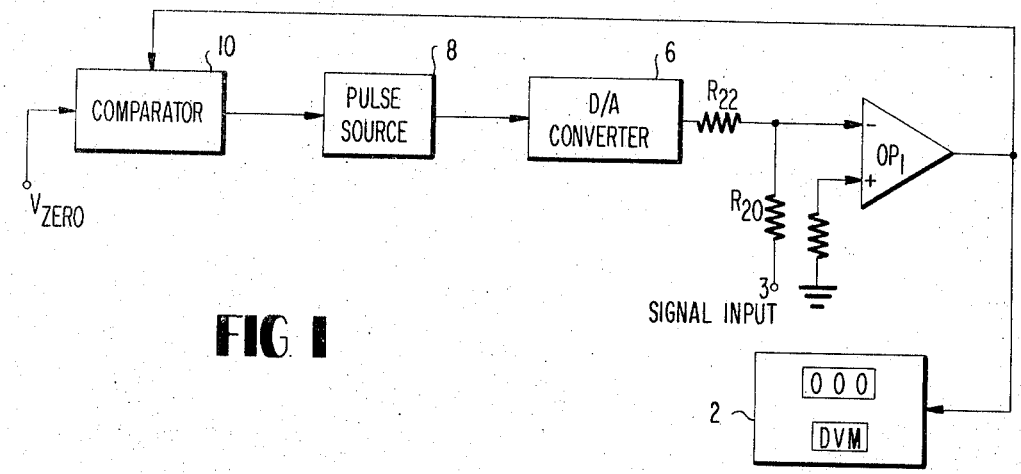
FIG. 1 is a block diagram of the automatic zeroing device of the present invention.

FIG. 1 is a block diagram of the automatic zeroing device. Measuring instrument 2 is shown as a digital voltmeter registering 0 volts. In general, however, any voltage responsive measuring instrument, be it digital or analog, may be utilized with the automatic zeroing device so long as it is responsive to an analog input signal.

Input signals to meter 2 are derived from the output of summing amplifier $OP_1$. This amplifier may be a conventional operational amplifier with the signals to be summed appearing at the inverting terminal thereof. Thus, the input signal at terminal 3 and the zeroing signal from the D/A converter 6 are applied to the inverting terminal of summing amplifier $OP_1$.

The D/A converter 6 acts to supply an incrementally decreasing potential to the summing amplifier over a range of $+V_1$ to $-V_2$ in response to pulse signals generated by pulse source 8.

Assuming that the meter 2 is to be zeroed to a 0 volts reading, the reference signal $V_{zero}$ supplied a one input to the comparator 10 is set at 0 volts. The output of the comparator acts to enable the pulse source 8 so long as the output of the summing amplifier $OP_1$ is not a positive voltage. As soon as the output of the summing amplifier crosses 0 volts, the comparator 10 de-activates the pulse source 8 to block the D/A converter 6 from further incrementing its output or zeroing signal. However, due to the operation of the converter 6, its output signal, that is the zeroing signal, at the time the pulse source 8 is de-activated remains. In this manner, the voltmeter 2 can be made to read a predetermined value irrespective of the value of the input signal to terminal 3.

Figure 2:
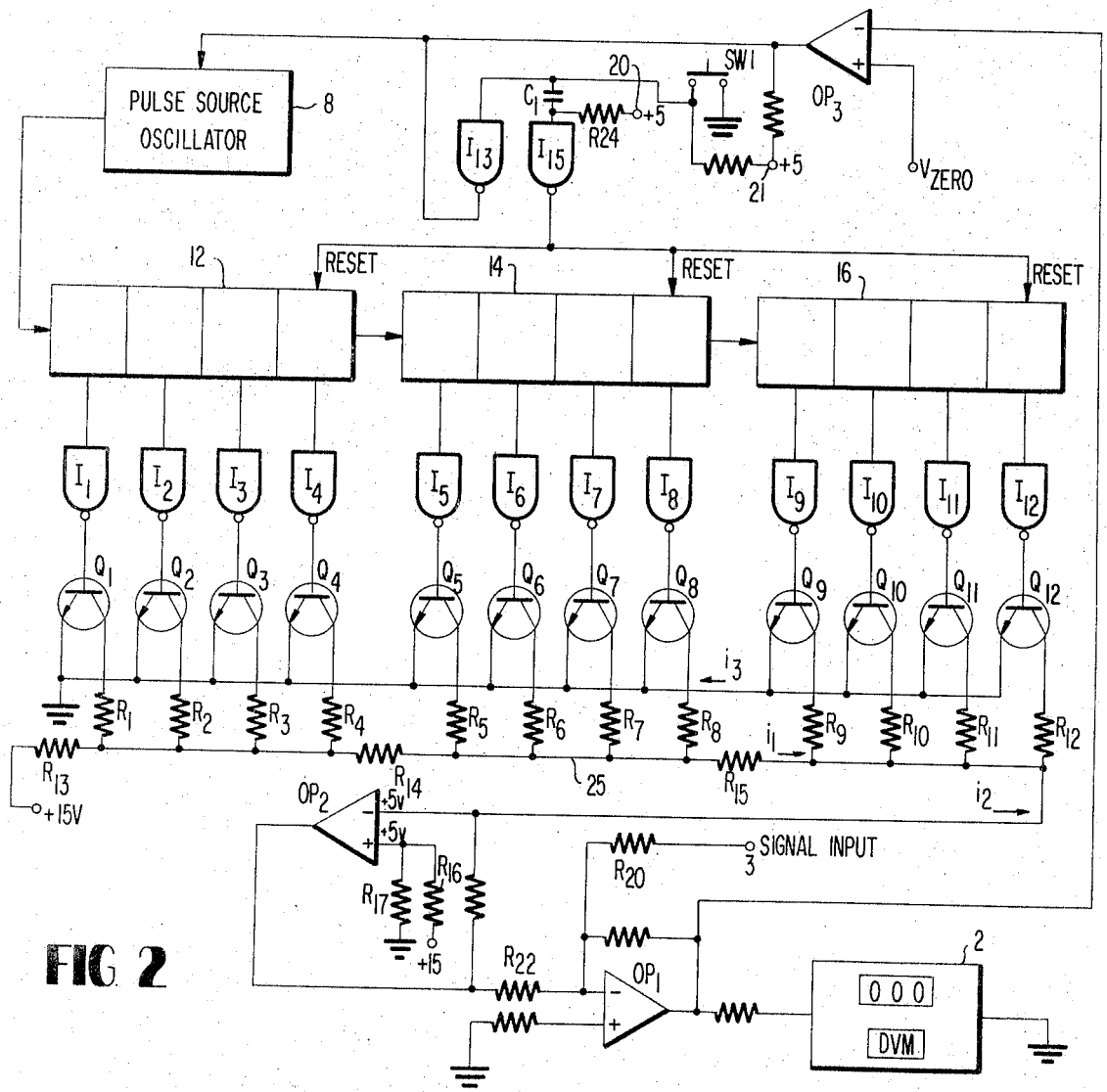
FIG. 2 is a detailed schematic diagram of circuitry comprising the automatic zeroing device.

Operation of the automatic zeroing device may be more fully understood by referring to FIG. 2 which details the circuitry of the automatic zero device.

The values given below for some of the circuit elements correspond to the values found suitable for the desired operating characteristics given. However, these values are in no way intended to be limiting upon the scope of the invention and are set forth herein only to aid the reader in obtaining a full understanding of the invention. It is believed to be within the skill of those with ordinary skill in the art to be able to vary the range of the zeroing signal as well as the magnitude of the incremental potential drops too meet specific application requirements in light of the following description.

The digital to analog converter 6 includes a binary counter comprised of counter units 12, 14 and 16, each stage of which is coupled through an inverter circuit $I_1 - I_{12}$ to a corresponding transistor $Q_1 - Q_{12}$. These transistors act as switching elements to selectively switch resistors $R_1 \ldots R_{12}$ into or out of a ladder network. The ladder network comprising resistors $R_1 - R_{15}$ is connected to the inverting input of a summing amplifier $OP_2$. The non-inverting input of amplifier $OP_2$ is elevated to a fixed potential by a voltage divider circuit comprising resistors $R_{16}$ and $R_{17}$. In the illustrative embodiment being described, the non-inverting input is elevated to +5v. Thus the inverting input will also be at +5v by operational amplifier action. The ladder network operates to subtract current from this input in a binary weighted manner. For the embodiment shown, the ladder resistors $R_1 - R_{15}$ may tae the following values.

$R_1, R_5, R_9$ —22.6 K ohms
$R_2, R_6, R_{10}$ —11.3 K ohms
$R_3, R_7, R_{11}$ — 5.62 K ohms
$R_4, R_8, R_{12}$ — 2.8 K ohms
$R_{13}$ — 5 ohms
$R_{14}$ — 69.8 ohms
$R_{15}$ — 2.56 K ohms Comparator 10 comprises zero crossing detector $OP_3$. Pulse source 8 may take the form of a conventional oscillator generating incrementing pulses which are applied to counter unit 12 at a repetition rate of 8 KHz.

Operation of the automatic zeroing device will now be described. Let it be assumed that an input signal is applied to signal input terminal 3 and that the operator desires the output of summing amplifier $OP_1$ to be brought to 0 volts, thus causing meter 2 to read 0 volts notwithstanding the signal input terminal 3 sees other than 0 volts. To accomplish this zeroing operation the $V_{zero}$ input to comparator $OP_3$ is brought to 0 volts and switch SW1 is depressed and held closed during the zeroing operation.

Before switch SW1 is depressed, the inputs to inverters $I_{15}$ and $I_{13}$ are at approximately +5v, causing their outputs to be at what may be termed a logic low. Thus the output of inverter $I_{13}$ is at a low voltage level such that the combined potential supplied by the output of the comparator $OP_3$ and the output of the inverter $I_{13}$ is insufficient to trigger the pulse source oscillator 8 into operation.

When switch SW1 is depressed, the input to inverter $I_{15}$ immediately drops to ground potential raising its output to a logic high, resetting counter units 12, 14 and 16. As the potential across capacitor $C_1$ rises, the output of inverter $I_{15}$ goes to a logic low, thereby removing the reset signal. The closing of switch SW1 also drops the input of inverter $I_{13}$ to ground potential, thereby raising the output of this inverter such that its output when combined with a positive output from the comparator $OP_3$, occurring when the output of amplifier $OP_1$ is negative with respect to $V_{zero}$, triggers the pulse source 8 into operation. When the output of $OP_1$ goes positive with respect to $V_{zero}$, the output of the comparator goes low, pulling the output of inverter $I_{13}$ low and inhibiting the pulse source.

When the counter units are all reset, each stage thereof is at a logic low. Through the action of inverters $I_1 - I_{12}$, the logic low state of each counter stage is converted to a logic high at the base of switching transistors $Q_1 - Q_{12}$ to turn these transistors on. This connects resistors $R_1 - R_{12}$ into the ladder network. With all resistors switched into the network, a maximum amount of current is drawn from the summing amplifier $OP_2$ into the ladder network. This forces the output of amplifier $OP_2$ to raise to its maximum positive value which in this case is approximately +8v. The maximum positive output from amplifier $OP_2$ appears as one input to the inverting side of amplifier $OP_1$ through resistor $R_{22}$ forcing the output of summing amplifier $OP_1$ to assume a maximum negative value. This maximum negative value is sensed by comparator $OP_3$ whose output goes positive to trigger the oscillator into operation.

As oscillator 8 operates, it drives the counter units 12, 14 and 16 which in turn drive the switching transistors $Q_1 - Q_{12}$ through inverters $I_1 - I_{12}$, causing the output of summing amplifier $OP_2$ to decrease in steps of 0.002 volts. The counters count from left to right so that the left-most stage of counter unit 12 is the least significant stage. Thus the first pulse from the oscillator 8 sends the least significant stage of unit 12 to a logic high turning off transistor $Q_1$ which removes resistor $R_1$ from the ladder network. Thiss has the effect of increasing the current supplied by the ladder network to the inverting side of amplifier $OP_2$ which means that less current need be drawn from amplifier $OP_2$ to keep its inverting input at +5v. Therefore, the potential at the output of the amplifier drops. The values of resistors $R_1 - R_{15}$ are selected so that as the counter units increment, the output of amplifier $OP_2$ generally drops in increments of 0.002 volts.

However, to the tolerances of thee ladder resistors, in response to certain binary counts, the output of summing amplifier $OP_2$ will go some amount more positive rather than 0.002 volts more negative. However, since it is the negative going steps from amplifier $OP_2$ which cause the output of amplifier $OP_1$ to advance in the positive direction, that is towards correspondence with the input signal to terminal 3, it matters not that on occasion the output of amplifier $OP_2$ goes positive rather than negative. These positive excursions can only cause the output of amplifier $OP_1$ to go more negative which keeps the device operating until some number is reached that will zero the output of amplifier $OP_1$.

Since positive excursions are not detrimental to the operation of the device, ladder network resistors need not be high precision components. In fact, the device of the invention can be built with 5 percent resistors throughout the ladder network.

The reason why positive steps will sometimes occur can be more clearly seen from the following. Positive steps occur when a binary number is reached which causes one resistor to switch out of the ladder and many to switch in. For example, let it be assumed that the counters store the binary number 1111 1111 0000, the bits being weighted from left to right. The next sequential binary number is then 0000 0000 1000. Thus initially transistors $Q_1 - Q_8$ are off while transistors $QQ_9 - Q_{12}$ are on, causing resistors $R_1 - R_8$ to be out of the ladder network. When the next sequential binary number enters the counter, transistors $Q_1 - Q_8$ switch on while transistor $Q_9$ turns off. In order to make the output of amplifier $OP_2$ drop 0.002v, ± 0.0002v in response to this new count in the counter, the tolerance of resistor $R_9$ would have to be 10 percent of 1/256 or 0.04 percent. Such resistors are not available and even if they were they would be extremely expensive.

In order to use standard, inexpensive, 1 percent resistors, the values of $R_{13}$, $R_{14}$, and $R_{15}$ may be changed slightly from the ideal values to allow for tolerance variations in the ladder resistors $R_1 - R_{12}$. As an example, when $R_1 - R_8$ are switched in and $R_9$ is switched out, $I_2$ increases on that step due to the value of $R_{15}$. This in turn makes the output of $OP_2$ to take one step positive to assure that the tolerance of $R_9$ will never cause the output of $OP_2$ to go more than a 0.002 v negative step at any time. Thereafter, the output of $OP_2$ continues to drop in a negative direction in 0.002v increments.

Again, the positive excursion at the output of amplifier OP$_2$, when one resistor switches out of the circuit and many switch in, is not detrimental to the operation of the device and points out an important feature of the invention. Since inexpensive resistors can be used to make up the ladder network the device can be made relatively inexpensive.

After zeroing operation is complete, switch SW1 is opened. When another input signal is applied to input terminal 3 the meter 2 will read the difference between the zeroed input signal and the new input signal. Since switch SW1 is open, pulse source 8 is blocked from operating and therefore the zeroing signal does not change even though there is a new input signal.

In the event that the input signal is outside the range of the device and thus cannot be zeroed, the device continues to run, causing the voltmeter 2 to flash meaningless numbers to the operator thus informing him that the input signal is outside the range of the device.

While the invention has been particularly shown and described with reference to a preferred embodiment thereof, it will be understood by those skilled in the art that various changes in form and detail may be made therein without departing from the spirit and scope of the invention.

What is claimed is:

1. A device for automatically causing a voltage responsive measuring instrument to register a predetermined reading in response to an input signal having a value other than that corresponding to said predetermined reading comprising:
   a. a summing amplifier receiving said input signal and a varying zeroing signal;
   b. a comparator, one input of which receives the output of said summing amplifier, a second input receiving a signal corresponding to said predetermined reading;
   c. a pulse source responsive to said comparator for producing pulse signals when the summing amplifier output does not correspond to said signal which corresponds to the predetermined reading;
   d. a digital to analog converter comprising a counter, incremented in response to said pulse signals, a resistive ladder network, transistor switches coupled between the stages of said counter and selected resistors of said ladder network for selectively switching said resistors into or out of said ladder network in response to the count in said counter and a ladder network summing amplifier, an input of which is coupled to said ladder network, its output supplying said zeroing signal, said zeroing signal being incrementally varied in response to the count in said counter;
   e. said pulse source ceasing to produce pulse signals in response to correspondence between said summing amplifier output and said signal which corresponds to the predetermined reading, said counter storing the count which resulted in said correspondence.

2. The device of claim 1 further including a trigger means for initiating a zeroing operation, said trigger means comprising a manually operable switch and means responsive to the closing of said switch for resetting said counters and for supplying an enabling signal to said pulse source, said enabling signal when combined with the comparator output when the input signals thereto do not correspond, triggering said pulse source into operation.

* * * * *